Figure 1:
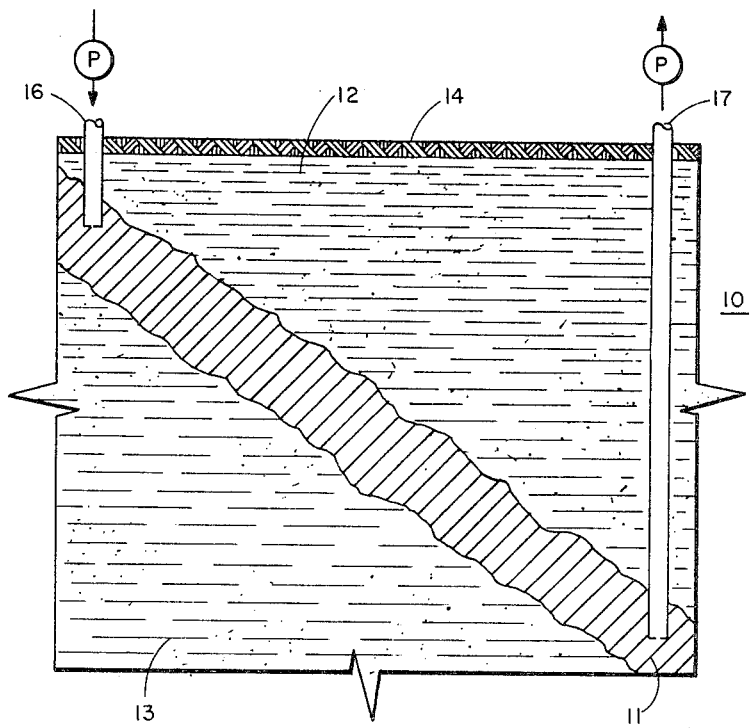

Oct. 11, 1966     J. L. FITCH ETAL     3,278,232
IN SITU LEACHING METHOD
Filed Sept. 26, 1963

JOHN L. FITCH   INVENTORS
BILLY GEORGE HURD

BY
*Emil J. Bednar*
ATTORNEY

_United States Patent Office_

3,278,232
Patented Oct. 11, 1966

3,278,232
IN SITU LEACHING METHOD
John L. Fitch and Billy George Hurd, Dallas, Tex., assignors to Mobil Oil Corporation, a corporation of New York
Filed Sept. 26, 1963, Ser. No. 311,689
20 Claims. (Cl. 299—4)

This invention relates to a method for recovering values from minerals in the earth. More particularly, it relates to a method for in situ leaching of metallic or metalliferous minerals disposed in subterranean deposits.

There are metallic minerals which cannot be extracted from the earth by conventional mining methods to recover their more valuable constituents within economic feasibility. In many instances these deposits of metallic minerals are either disposed deep within the earth or they are of such relatively small extent that providing the necessary tunnels and shafts to reach them through conventional mining procedures is not economically justified. Many of these metallic mineral deposits were formed by the depositions of valuable metals and their salts from mineralized solutions passing through porous permeable formations. Other of the metallic mineral deposits were formed by geologic activity from a deep-seated magma. Some of the metallic mineral deposits were formed by a combination of several modes of geological creation. The metallic mineral deposits, as a group irrespective of origin, are usually found in a variety of environments within the earth. For example, they may be found as deposits in sedimentary formations, in igneous formations, or as veins in either sedimentary or igneous formations.

Various processes for in situ leaching economically to recover values from such mineral deposits have been proposed. For example, it has been proposed to fill the mineral deposit with a liquid leaching solvent to dissolve the desired metallic constituents. Thereafter, the pregnant solvent is removed from the deposit to the earth's surface for recovery of the dissolved metallic constituents. A number of problems are present in such method for recovering the metallic minerals through the use of a leaching solvent from subterranean deposits. One problem resides in the low traversing rates of liquids in the deposit filled with the solvent. This reduction in ready-liquid flows requires extended periods of time in which to contact the solvent with most of the deposit. It also reduces the amount of pregnant solvent which can be readily recovered from the deposit. Another related problem is that the leaching solvents, as liquids, cannot be readily circulated throughout the mineral deposit and, therefore, all portions of the mineral deposit may not be leached. This, of course, can result in the leaching solvent bypassing extensive portions of the mineral deposit. The primary condition which creates these problems is the relatively low mobility of the leaching solvent in the liquid-filled mineral deposit. The recovery of metallic minerals from subsurface deposits by in situ leaching appears to be promising from an economic aspect if the previously mentioned problems can be resolved.

Figure 2:
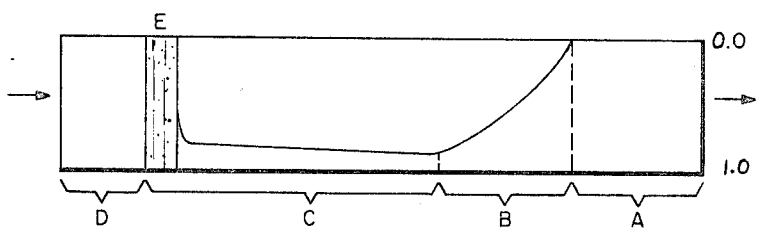

It is an object of the present invention to provide a method for recovering metallic, or metalliferous, minerals from subsurface deposits without encountering the heretofore-described problems. Another object is to provide a method for in situ leaching of metallic, or metalliferous, minerals disposed in a subsurface deposit using a highly mobile gaseous solvent. Another further object is the rapid and uniform displacement throughout a subsurface deposit of metallic minerals of a highly mobile leaching solvent so as to reach with certainty the most remote extremity of such deposit. A further object is to circulate readily a solvent in accordance with the preceding object throughout a deposit unit substantially all of the in situ metallic minerals are placed in a form for ready fluid removal. Yet another object is to provide for recovering metallic minerals from subsurface deposits using inexpensive solvents and other materials. Another object is the recovery of the metallic minerals in accordance with the preceding objects which, upon completion, places the deposit in a condition for ready repetition of the steps of the present method should another cycle of operation be desired. These, and other objects, will be more apparent when read in conjunction with the following description, the appended claims, and the attached drawings of a preferred embodiment wherein:

FIGURE 1 is a vertical section taken through the earth showing a subsurface deposit containing a metallic mineral to be subjected to the steps of the present method, and FIGURE 2 is a graphic illustration of the property of the relative permeability to gases of the deposit shown in FIGURE 1 during application of the various steps of the present method.

The objects of the present invention are obtained by practicing certain steps on a metallic mineral disposed in a subsurface deposit. These steps include flooding the deposit with water until it is substantially water-wet where the deposit is not initially water-wet. By "water wet," as the terms is used herein, it is meant that substantially all of the solid surfaces of the deposit are wetted with water. At least a portion of the water in the deposit is displaced by flooding with air so as to increase the permeability to gas of the water-wetted deposit. Gaseous ammonia is passed through the water-wetted deposit in an air atmosphere whereby metallic ions, which are capable of combining with ammonia to form complex ions, are made soluble in water by their reaction with the ammonia. Lastly, the complex ions are recovered from the deposit by displacement with a waterflood containing sufficient ammonia to preserve the complex ions in solution.

In many cases the location and extent in the earth of a subsurface deposit containing a metallic mineral will be known. However, in the even that such deposit must be located, any means may be used for this purpose. For example, an earthen formation thought to contain such mineral deposit may be subjected to a geophysical survey. The geophysical survey may be any method for locating a metallic mineral deposit such as radioactive logs and gravitometer and magnetometer explorations. Also, the metes and bounds of the metallic mineral deposit may be determined by this or other suitable method. The geophysical survey, for the purposes of this description, will be assumed to have been performed upon a portion of the earth 10 and, as shown in FIGURE 1, to disclose a metallic mineral deposit 11 disposed between earthen formations 12 and 13. An overburden 14 may be superimposed upon the formation 12. For purposes of this invention, the metallic mineral deposit 11 may be considered as being formed of a mass of angular fragments of metallic minerals filling a fissure, crevice, or other opening between the formations 12 and 13. The deposit 11 may have been formed as a primary ore deposit by geological processes from deep-seated magma, as a replacement process of the materials originally contained in the opening between the formations 12 and 13 with metallic substances by mineralized water, or as a combination of both processes. The present invention, as will be apparent, is not limited to any particular type deposit or its location in the earth.

For purposes of this invention, the metallic mineral in the deposit 11 may contain one or more of the many metallic ions, or metals convertible to such metallic ions, which ions combine with ammonia in the presence of water to form a complex ion that is soluble in water. The metallic ion may be univalent or polyvalent to form the metal ammonia complexes. The metallic ion may be of copper, more particularly the cuprous and cupric ions. However, other like functional metals, such as silver or nickel, may be present and similarly be complexed with ammonia. For example, the cupric ion combines with ammonia in solution in water to form a very weakly ionized complex ion which has the structure of $$Cu(NH_3)_n^{++}$$

In this formula, $n$ may be 2, 4, 5, and 6. Most commonly $n$ is 4. Generally, these complex ions are only silghtly dissociated in ammoniacal water solutions. Therefore, if enough ammonia is added to the metallic mineral in the presence of water, all of the complex-forming metallic ions in such mineral will completely dissolve by forming the complex ions. The present method uses such properties particularly for recovering the cuprous and cupric ions from any metallic mineral containing copper. Usually such mineral will be chalcocite ($Cu_2S$), chalcopyrite ($CuFeS_2$), and other copper-bearing sulfides. The deposit 11 may be considered in the following disclosure to contain copper-bearing minerals such as those described.

Referring first to FIGURE 1 of the drawings, a description of a preferred embodiment of the method of this invention will be given. In FIGURE 1 of the drawings, the metallic mineral deposit 11 is angularly disposed through the earth 10 between the formations 12 and 13. A pair of spaced-apart wells 16 and 17 penetrating the earth and terminating in fluid communication with the deposit 11 are provided. The wells 16 and 17 may be provided with the usual apparatus for transmitting fluids between the earth's surface and the deposit 11. Where the deposit 11 is not originally water-wet, or for other reasons apparent hereinafter, the deposit 11 is flooded with water as a first step of the present invention. The desired condition of water-wet is, of course, that the solid surfaces of the deposit 11 are wetted with water. The complete flooding of the deposit 11 with water is of advantage in that the water will leach out the water-soluble salts, such as sodium chloride, and other water-soluble materials. This increases the flow-carrying capacity of the deposit 11 through the created voids. Additionally, the water provides the environment in which to form the metal-ammonia complex ions.

Where the deposit 11 is flooded with water, the next step of the present method is practiced. The water in the deposit 11 is displaced at least in part through the well 17 from the deposit 11 by air injected through well 16. This creates an airflood of the deposit 11. The water may be removed from the deposit 11 through the well 16 by the air injected through the well 17, if desired, or by other means such as pumping. Preferably, the air is injected in sufficient volumes through the deposit 11 to displace substantially all of the water removable by air stripping. The water can be reused in repeating the present method, if desired. This is an advantage in water-scarce locations. Obviously, the permeability to gas of the water-wetted deposit 11 is increased with a portion of the water removed. Additionally, the removal of as large a portion of the water as possible from the deposit 11 greatly assists the oxidation capabilities of the airflood to the in situ metallic mineral. One reason is that air is not very soluble in water. Only a small amount of mineral-oxidizing air can be dissolved in even a large mass of water. Thus, by leaving only a small amount of water dispersed over a large surface, large amounts of mineral-oxidizing air can be brought into contact with the mineral. Air is, of course, a most inexpensive oxidant.

Reference may be had now to FIGURE 2 where the fluid-flowing properties of the deposit 11 are graphically illustrated. In FIGURE 2, the various steps of the present method are identified by brackets A through D. The vertical components of the illustration, having a scale of 1.0 to 0.0, represent the relative permeability to gas, or the fluid-flowing condition, of the deposit 11 during the various steps of the present method. The bracket A illustrates the condition of the deposit 11 while it is flooded with water and having a low permeability to gas indicated on the scale as 0.0. It will be apparent that the permeability to gas of the deposit 11, and the ease of obtaining fluid flows, is reduced by that condition established by the water filling the porous spaces of the deposit 11. Upon the displacement of at least a portion of the water from the deposit 11 with an airflood, the step represented by bracket B, the permeability to gas of the deposit 11 is increased, as shown by the scale reading of 0.8, through obtaining the increased pore spaces, channels, and other openings through which fluids may more readily flow by the removal of the water plugs and also the water-soluble salts. Thus, air may be circulated through the deposit 11 between the wells 16 and 17 to remove the water to the equilibrium amount obtainable by air stripping. When the maximum desired permeability is obtained by the injection of air, the remaining steps of the present invention may be taken. Thus, a most inexpensive fluid, air, provides for stripping the deposit 11 of water and oxidizing any metal, or metallic ions to their higher oxidative state. Where the deposit 11 originally is water-wet, the step of waterflooding may be omitted, and the present method initiated with the airflooding step, if desired.

The next step comprises the passing of gaseous ammonia into the water-wetted deposit 11. The gaseous ammonia may be injected through one of the wells 16 or 17 to traverse the deposit 11 until ammonia reaches the other of the wells. The air injection into the deposit 11 may be now terminated but preferably it is continued. Injecting ammonia with the air to provide the step of airflooding is the equivalent of separately injecting air and then ammonia, and may be so practiced in the present method. The concentration of ammonia is readily controlled by the rate of introduction, mixing it with air, or both. It is envisioned in some cases that the gaseous ammonia may be circulated through the deposit 11 between wells 16 and 17 intermixed with the injected air. Sufficient ammonia should be introduced into the deposit 11 in an amount to react with all metallic ions to form the desired metal-ammonia complex ions and an excess amount to compensate for the parasitic consumers of ammonia. The passing of the gaseous ammonia through the water-wetted deposit 11 is of great advantage. First, the mobility of the gaseous ammonia is relatively high and, therefore, it will readily penetrate to all extremities of the deposit 11. Thus, the ammonia is readily made to contact all of the copper mineral in the water-wetted deposit 11. Although the amount of water remaining in the deposit 11 may be small, large amounts of ammonia are soluble in such water. For example, one volume of water at 20° C. is capable of dissolving about 700 volumes of ammonia under one atmosphere of pressure. Even greater amounts of ammonia can be dissolved in water at elevated pressures. Under such circumstances, the ammonia readily dissolves in the water yet remaining extensively dispersed in the deposit 11. The ammonia in solution will readily react with the copper ions in the deposit 11 forming the complex ion, i.e., the copper-ammonia ion. Thus, the metallic ions are combined with ammonia to form a complex ion which is highly soluble in ammoniated water. The heat generated when the gaseous ammonia dissolves in the water contained in the deposit 11 is advantageous in that it accelerates the reaction between the in situ ammonia and the cuprous and cupric ions in the deposit 11. Also, such heat accelerates the air oxidation of the copper-bearing minerals to produce cuprous and cupric ions.

If desired, the gaseous ammonia and air passed into the deposit 11 may be recirculated until a sufficient amount of ammonia has been passed through the deposit 11 to convert all of the metallic ions to the solubilized complex metal-ammonia ions, and to react with any parasitic consumers of ammonia and air that may be present. Thus, for practical purposes, no ammonia will be lost in this step of the present invention.

The introduction of the ammonia into the airflooded deposit 11, or the mixture of air with the ammonia into the deposit 11, is of great advantage in that the air in the deposit 11 will insure formation of the higher oxidative states of the metals and their metallic ions of the type described, which substances are present in the deposit 11. The oxidation of these metals, including their lower oxidative states, to their higher oxidative states places them into forms that may more readily be combined with ammonia to form the metal-ammonia complex ions that are soluble in water. Also, the presence of air prevents the ammonia from reducing the metal ions present in the deposit 11 to their lower oxidative states. In some cases, it may be desirable to remove the air from the deposit 11. For this result, only gaseous ammonia may be injected into the deposit 11 via one of the wells 16 or 17 to miscibly displace the air from the deposit 11 via the other of the wells.

Referring to FIGURE 2, the step of injecting the gaseous ammonia into the deposit 11 is shown by the bracket C. It will be apparent that large quantities of ammonia will initially only slightly change the high permeability to gas or fluid-flowing character of the deposit 11. Thus, the high mobility advantages of the gaseous ammonia are maintained throughout the desired formation of the metal-ammonia complex ions. After substantial reaction of such metallic ions with ammonia, the permeability to gas of the deposit 11 increases only slightly because of the solutions formed by such reaction. The copper-ammonia complex ions are recovered in the next step of the present method by their displacement from the deposit 11 with a waterflood containing sufficient ammonia to preserve the complex ions in solution in such waterflood. The portion of FIGURE 2 denoted by the bracket D illustrates the step of using the waterflood to recover the metal-ammonia complex ions.

The waterflood displacement step is obtained by injecting water into the deposit 11 through one of the wells, preferably the well 17, and recovering the metal-ammonia complex ions from the other of the wells, preferably well 16. The water should contain sufficient ammonia to maintain the compex ions in solution. The ammonia may be absorbed from the deposit 11, or it may be added directly to the water being injected where necessary. The water miscibly displaces substantially all of the solutions of metal-ammonia complex ions from the deposit 11. A water to metal-ammonia complex ion composition graded barrier, indicated by the bracket E in FIGURE 2, between the waterflood and the metal-ammonia complex ions present in the deposit 11 provides for the miscible displacement result. This result is of great advantage in that substantially all of the metal-ammonia complex ions are recovered from the deposit 11. By providing sufficient ammonia in such waterflood to preserve the complex ion in solution, no metallic ions will be reprecipitated in the deposit 11 before they can be recovered through the well 17. In some cases, ammonia may not be necessary to preserve the complex ion in solution where there is no precipitation problem during the waterflood. This situation is included within the terminology "containing sufficient ammonia to preserve the complex ions in solution in the waterflood." As all of the deposit 11 has been water-flooded by this step, it is apparent that the deposit 11 is again essentially in the same condition as it was after practicing the first step of the present method wherein the deposit 11 is flooded with water until it is made water-wet. Of course, the initial waterflood may contain ammonia. This is a great advantage in that should it be desired to again in situ leach the deposit 11, only the few remaining steps of the present method would need to be repeated. The metal values can be recovered from the pregnant solvent displaced by the waterflood by any suitable means, such as electrolysis.

Although the present method has been described as being applied to a copper-bearing mineral deposit, it will be apparent that it can be applied to various deposits of other minerals having metallic ions capable of being combined with ammonia to form metal-ammonia complex ions.

From the foregoing, it will be apparent that the method herein described is well suited to satisfy all of the stated objects of the present invention. Also apparent is that significant advantages can be obtained through the use of gaseous ammonia in the recovery of metal values from a subterranean deposit. One outstanding advantage resides in the increased mobility of such leaching solvent to provide a high efficiency in the recovery of the desired metallic ion. Various changes and alterations in the steps of the present method can be made by those skilled in the art without departing from the spirit of the invention. It is intended that such changes and alterations be encompassed within the appended claims. The description of the present method is illustrative and the only limitations to be applied are those recited in the appended claims.

What is claimed is:

1. An in situ leaching method for recovering from subsurface mineral deposits metallic ions capable of combining with ammonia to form metal-ammonia complex ion that are soluble in water, comprising the steps of:
   (a) flooding the deposit with water until it is substantially water-wet,
   (b) displacing at least a portion of the air-strippable water from the deposit with injected aid to increase the permeability to gas of the water-wetted deposit sufficiently to permit a continuous flow of air therethrough,
   (c) passing gaseous ammonia into the water-wetted deposit whereby metallic ions capable of combining with ammonia to form complex ions are made soluble in water, and
   (d) recovering the resulting metal-ammonia complex ions from the deposit by displacement with a waterflood containing sufficient ammonia to preserve the complex ions in solution in such waterflood.

2. The method of claim 1 wherein the metallic ions are of copper.

3. The method of claim 1 wherein in step (c) a mixture of ammonia with air is passed into the water-wetted deposit in sufficient volumes to react with all of the described metallic ions and any parasitic consumers of ammonia and air that may be present.

4. The method of claim 1 wherein the steps (b) through (d) are repeated at least once.

5. An in situ leaching method for recovering from subsurface mineral deposits metallic ions capable of combining with ammonia to form metal-ammonia complex ions that are soluble in water, comprising the steps of:
   (a) flooding the deposit with water until it is substantially water-wet,
   (b) displacing substantially all of the air-strippable water from the deposit by passing air therethrough to increase the permeability to gas of the water-wetted deposit by removing a portion of the water to permit a continuous flow of the air therethrough,
   (c) passing a sufficient amount of gaseous ammonia in admixture with air into the water-wetted deposit whereby metallic ions capable of combining with ammonia to form complex ions are made soluble in water, and
   (d) recovering the metal-ammonia complex ions from the deposit by displacement with a waterflood containing sufficient ammonia to preserve the complex ions in solution in such waterflood.

6. The method of claim 5 wherein the metal ions are of copper.

7. The method of claim 5 wherein the gaseous ammonia and air mixture is recirculated through the water-wetted deposit until all of the metallic ions and any parasitic consumers of ammonia and air that may be present have reacted with the ammonia admixture with air.

8. The method of claim 5 wherein the steps (b) through (d) are repeated at least once.

9. An in situ leaching method for recovering from water-wetted subsurface mineral deposits metallic ions capable of combining with ammonia to form metal-ammonia complex ions that are soluble in water, comprising the steps of:
 (a) flooding the deposit with injected air to remove a portion of the air-strippable water sufficiently to permit a continuous flow of air therethrough,
 (b) passing gaseous ammonia into the water-wetted deposit whereby metallic ions capable of combining with ammonia to form complex ions are made soluble in water, and
 (c) recovering the resulting metal-ammonia complex ions from the deposit by displacement with a waterflood containing sufficient ammonia to preserve the complex ions in solution in such waterflood.

10. The method of claim 9 wherein the metallic ions are of copper.

11. The method of claim 9 wherein in step (b) a mixture of ammonia with air is passed into the water-wetted deposit in sufficient volumes to react with all of the described metallic ions and any parasitic consumers of ammonia and air that may be present.

12. The method of claim 9 wherein the steps are repeated at least once.

13. An in situ leaching method for recovering from water-wetted subsurface mineral deposits metallic ions capable of combining with ammonia to form metal-ammonia complex ions that are soluble in water, comprising the steps of:
 (a) flooding the deposit with injected air to remove a portion of the air-strippable water sufficiently to permit a continuous flow of air therethrough,
 (b) passing a sufficient amount of gaseous ammonia in admixture with air into the water-wetted deposit whereby metallic ions capable of combining with ammonia to form complex ions are made soluble in water, and
 (c) recovering the metal-ammonia complex ions from the deposit by displacement with a waterflood containing sufficient ammonia to preserve the complex ions in solution in such waterflood.

14. The method of claim 13 wherein the metal ions are of copper.

15. The method of claim 13 wherein the gaseous ammonia and air mixture is recirculated through the water-wetted deposit until all of the metallic ions and any parasitic consumers of ammonia and air that may be present have reacted with the ammonia admixture with air.

16. The method of claim 13 wherein the steps are repeated at least once.

17. An in situ leaching method for recovering from subsurface mineral deposits metallic ions capable of combining with ammonia to form metal-ammonia complex ions that are soluble in water, comprising the steps of:
 (a) flooding the deposit with water until its solid surfaces are wetted and its openings are at least in part filled with water,
 (b) flooding the deposit with air for removing air-strippable water therefrom to clear the openings in said deposit of water sufficiently to permit a continuous flow of the air therethrough,
 (c) passing gaseous ammonia through the water-wetted deposit whereby metallic ions capable of combining with ammonia to form complex ions are made soluble by the gaseous ammonia being taken into solution in the water remaining on the solid surfaces of said deposit, and
 (d) recovering the resulting metal-ammonia complex ions from the deposit by displacement with a waterflood containing sufficient ammonia to preserve the complex ions in solution in such waterflood.

18. The method of claim 17 wherein the metallic ions are of copper.

19. The method of claim 17 wherein in step (c) a mixture of ammonia with air is passed into the water-wetted deposit in sufficient volumes to react with all of the described metallic ions and any parasitic consumers of ammonia and air that may be present.

20. The method of claim 17 wherein the steps (b) through (d) are repeated at least once.

References Cited by the Examiner

UNITED STATES PATENTS

| | | | |
|---|---|---|---|
| 1,690,446 | 11/1928 | Grant et al. | 299—5 X |
| 1,843,808 | 2/1932 | Dowsett | 23—55 |
| 2,563,623 | 8/1951 | Scott | 299—5 X |
| 2,663,618 | 12/1953 | Babbitt et al. | 75—103 X |
| 2,818,240 | 12/1957 | Livingston | 299—4 |

ERNEST R. PURSER, *Examiner*.

UNITED STATES PATENT OFFICE
CERTIFICATE OF CORRECTION

Patent No. 3,278,232　　　　　　　　　　　　　October 11, 1966

John L. Fitch et al.

It is hereby certified that error appears in the above numbered patent requiring correction and that the said Letters Patent should read as corrected below.

Column 2, line 1, for "unit" read -- until --; line 25, for "water wet" read -- water-wet --; line 26, for "terms" read -- term --; line 40, for "even" read -- event --; column 3, line 11, for "silghtly" read -- slightly --; column 6, line 31, for "ion" read -- ions --; line 35, for "aid" read -- air --.

Signed and sealed this 5th day of September 1967.

(SEAL)
Attest:

ERNEST W. SWIDER　　　　　　　　　　　　EDWARD J. BRENNER
Attesting Officer　　　　　　　　　　　　　　Commissioner of Patents